May 9, 1933.  W. G. MILLER  1,908,041
WATER HEATER
Filed Sept. 18, 1931
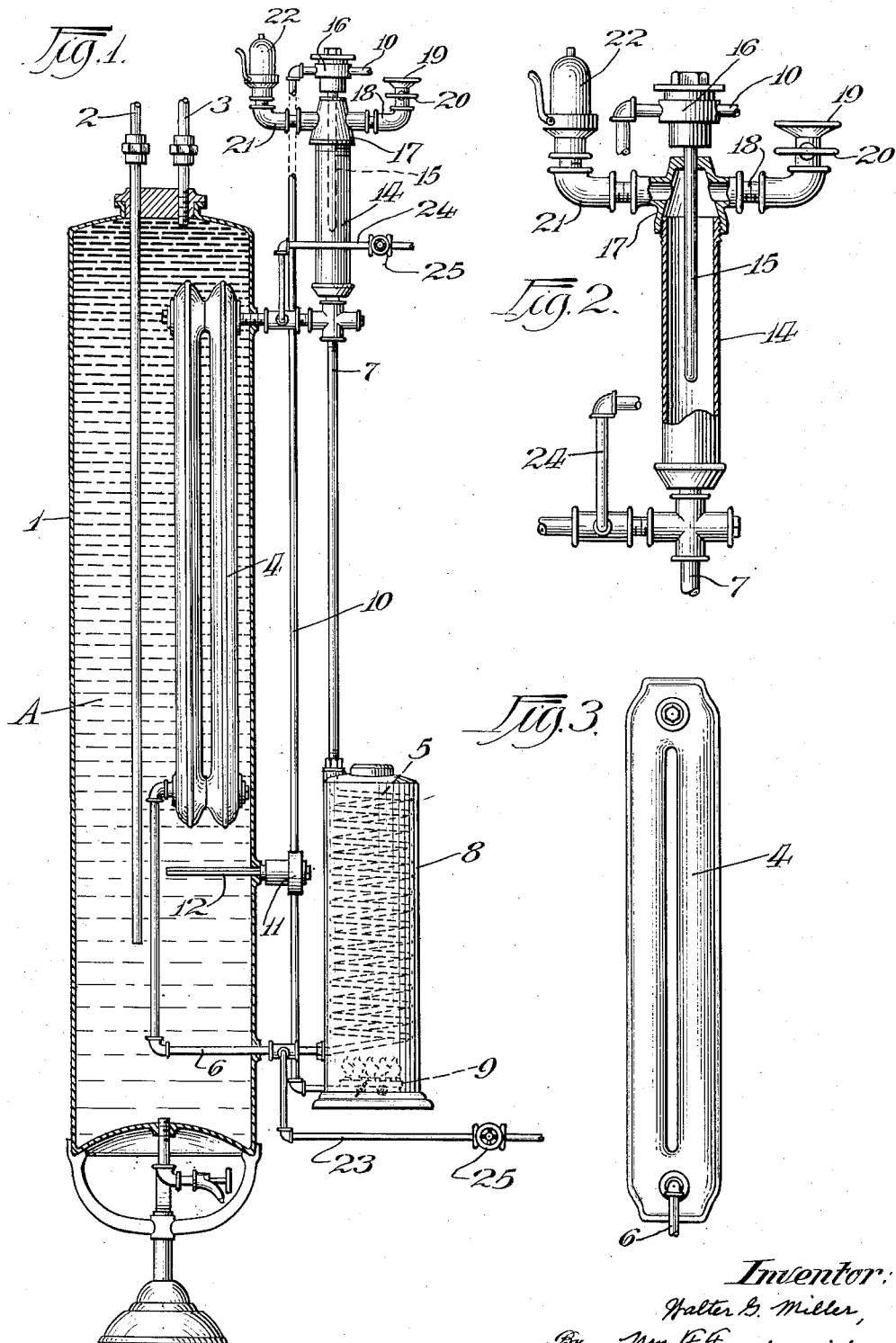

Patented May 9, 1933

1,908,041

UNITED STATES PATENT OFFICE

WALTER G. MILLER, OF CHICAGO, ILLINOIS

WATER HEATER

Application filed September 18, 1931. Serial No. 563,563.

In the ordinary types of water heaters to supply hot water for household use, the water to be consumed comes in direct contact with the metal surfaces that are heated by the gas or other flame. Consequently the water is raised to a temperature high enough to cause precipitation of the lime in hard water and, where hard water is being used, the heating coils soon become so caked as to burn out readily. It sometimes happens that a heating coil will burn out in a few weeks.

The object of the present invention is to produce a heater for heating either hard or soft water, without danger of precipitation and thereby cutting down the efficiency of the apparatus and shortening its life.

All that is necessary in order to overcome the difficulty to which I have just referred, is to insure that hard water will at no time be raised to the temperature at which the minerals will separate therefrom; this being usually the boiling point of the water. However, if the water to be consumed contacts with one side of a metal part whose opposite side is exposed to a flame, it is impossible in actual practice to avoid the separation of the mineral matter in hard water. Therefore, in accordance with my invention, I indirectly heat the water to be consumed, by means of a heat interchanger through which flows a heating medium whose temperature may be controlled. By properly selecting the heating medium that flows through the heat interchanger, it will make no difference whether this heating medium be raised to or above the temperature of the boiling point of water at the time it is receiving heat from the flame or other source; and, therefore, as long as the temperature of this heating medium is controlled so that the heater interchanger does not become too hot, the objections to which I have referred will be avoided, regardless of the temperature to which the heating medium may be raised at the point of transmission of heat thereto. Ordinarily the heating medium may consist simply of soft water, conveniently rain water, containing no minerals to be precipitated. Furthermore, since there will be only a comparatively small quantity of this soft water, confined in a closed system, after any mineral matter originally contained in the water has once been precipitated, there will be no further precipitation that would form an objectionable coating or scale in the coils. In other words, even though the heating medium initially consisted of hard water, there would be very little mineral matter that could be precipitated, this inconsiderable amount of mineral matter being probably unobjectionable.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a view partly in elevation and partly in vertical section through a heater embodying the present invention; Fig. 2 is a view partly in elevation and partly in section, on a somewhat larger scale than Fig. 1, showing a fragment of the system; and Fig. 3 is an end view of the radiator or heat-interchanger.

In the drawing I have illustrated my invention as applied to a conventional type of hot water heater in which there is a tank, a burner and a coil through which water flows and to which heat is transmitted from the burner and, for the sake of brevity, the detailed description will be confined to this particular embodiment, although the invention is not limited thereto.

Referring to the drawing, 1 represents a tall tank provided with an inlet pipe 2 for cold water, and an outlet or a service pipe 3 for hot water. Normally the tank will be filled with water, indicated at A.

In accordance with my invention I mount within the tank a heat interchanger 4 of considerable capacity. In the ordinary small tank for household use, a radiator having nine or ten square feet of radiating surface will usually be found to be sufficient.

The water in the tank is heated by the heat interchanger which, in turn, receives heat from a heating medium flowing through the same. In the arrangement shown, the radiator is in a closed circuit which also contains a second heat interchanger in the form of a heating coil 5 exterior to the tank. The bottom of the radiator is connected to the lower end of the coil by a pipe 6, whereas there is a pipe line 7 between the upper ends of the radiator and the coil. The coil is shown as arranged in the usual or any suitable casing or shell 8 in the bottom of which is a gas burner 9. The heating coil is preferably disposed at a lower level than the radiator, to facilitate circulation of the liquid through the closed system when the burner is lighted.

Gas is supplied to the burner through a pipe 10. By placing in this pipe a thermostatic valve 11 whose thermal element 12 extends into the tank, the gas may be shut off automatically whenever the water in the tank or in that region of the tank in which the thermal element is located, reaches a desired maximum temperature.

As heretofore stated, it makes very little difference what the temperature is to which the water or other medium is temporarily heated in the coil 5, as long as the radiator does not become hot enough to cause separation or precipitation of the minerals contained in the water in the tank. Possibly the water or other heating medium, if the temperature were uncontrolled, might be heated to a degree that would cause the radiator to become too hot. I have, therefore, an additional controlling means for the burner, whereby the gas will be turned off in the event that the temperature of the water or other heating fluid entering the top of the radiator exceeds a certain maximum. To this end I have provided the pipe line 7 with a small standpipe 14 near the point where this pipe line connects with the top of the radiator. Extending down into the standpipe is the thermal element 15 of a second thermostatic valve 16 disposed in the gas supply pipe 10. This standpipe, which also serves as an expansion chamber, is partially filled with the water or other heating liquid whose temperature is at least as high as that of the liquid flowing into the radiator. If the temperature in the standpipe should become too high, the flow of gas will be reduced or cut off entirely, depending upon whether or not a pilot light is employed.

The top of the standpipe is closed by a cap 17 to which there are two connections. One of these connections, 18, is from a funnel 19 through which the system may be filled with water or other liquid; the connection being closed by a valve 20 after the system has been filled. The other connection, 21, terminates in a suitable safety valve 22. In the event that steam should be formed in the closed system, and the pressure become too great, the pressure will be relieved by the safety valve.

Frequently householders shut off the gas from these heaters in winter and heat the water from a coil placed in the fire box of the boiler or furnace. The heat interchanger in my design, could be connected to such a coil, although it would be very difficult to control the temperature of the radiator. The proper way, however, is to connect the heat interchanger 4 to the house heating system at such points that only hot water will flow through the radiator. If the house heating system be a hot water system the radiator or heat interchanger 4 may be connected in the house heating system in the same way as thought it were a house heating radiator. If the house heating system be one employing steam heat, the heat interchanger 4 in my heater must be connected to the boiler below the water level so that only water, and not steam, will circulate through the heat interchanger. For this purpose I have shown two pipes, 23 and 24, connected to the pipes 6 and 7, respectively; each of the pipes 23 and 24 containing a valve 25 which may be closed whenever the gas heater is in use and be opened when hot water is circulated through the heat radiator through the pipes 23 and 24 connected to the house heating system as heretofore explained.

It will thus be seen that I have produced a simple and novel apparatus or system for effectively heating hard water without the objectionable consequences resulting from over heating of such water. It will also be seen that incidentally I am able to supply heated water which will never be so hot as to scald the hands when the water flows thereon from a faucet, as sometimes happens with the ordinary water heating systems which at times deliver a mixture of hot water and steam.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In a water heating apparatus, a tank having a water inlet and a water outlet, a heat interchanger in the tank, a second heat interchanger outside of the tank and at a lower level than the first heat interchanger, piping connecting the lower ends of the heat interchangers, piping connecting the tops of the heat interchangers, a burner for heating the second heat interchanger, an expansion chamber in the piping above and near the top of the first heat interchanger, a safety valve connected to the expansion chamber, and means controlled by the temperature in the expansion chamber and the temperature of the water in the tank to supply fuel to the burner.

2. In a water heating apparatus, a tank having a water inlet and a water outlet, a heat interchanger in the tank, a second heat interchanger outside of the tank and at a lower level than the first heat interchanger, means including an expansion chamber connecting the heat interchangers to form a closed circulating system, a burner for heating the second heat interchanger, and means controlled by the temperature of the water in said circulating system and by the temperature of the water in the tank to supply fuel to the burner.

In testimony whereof, I sign this specification.

WALTER G. MILLER.